United States Patent [19]
Wada et al.

[11] Patent Number: 5,678,167
[45] Date of Patent: Oct. 14, 1997

[54] METHOD FOR DISSOLVING NUCLEAR FUELS

[75] Inventors: Yukio Wada, Mito; Kyoichi Morimoto, Naka; Takayuki Goibuchi, Mito; Hiroshi Tomiyasu, Yokohama, all of Japan

[73] Assignee: Doryokuro Kakunenryo Kaihatsu Jigyodan, Tokyo, Japan

[21] Appl. No.: 555,839

[22] Filed: Nov. 13, 1995

[51] Int. Cl.$^6$ ........................................... B01F 1/00
[52] U.S. Cl. .................... 423/20; 923/658.3; 204/157.15
[58] Field of Search ................... 423/20, 658.3; 204/157.15; 976/DIG. 392

[56] References Cited

U.S. PATENT DOCUMENTS

| | | | |
|---|---|---|---|
| 3,620,687 | 11/1971 | Wilson . | |
| 4,069,293 | 1/1978 | Tallent | 423/3 |
| 4,131,527 | 12/1978 | Friedman et al. | 204/157 |
| 4,333,912 | 6/1982 | Mills et al. | 423/20 |
| 4,434,137 | 2/1984 | Stoll et al. | 423/6 |
| 5,422,084 | 6/1995 | Madic | 423/20 |

OTHER PUBLICATIONS

Y. Wada et al., "Photochemically–Induced Valency Adjustment of Plutonium and Neptunium in Nitric Acid Solution Using Mercury Lamp", *Journal of Nuclear Science and Technology*, 31[7], pp. 700–710, Jul. 1994.

Y. Wada et al., "Photochemical Oxidation of Neptunium(V) to Neptunium(VI) in Nitric Acid Solution Containing Reductants", *Journal of Nuclear and Technology*, 32[10], pp. 1018–1026 (Oct. 1995).

Y. Wada et al., "Photochemical Dissolution of $UO_2$ Powder in Nitric Acid Solution at Room Temperature", *Radiochimica Acta*, 72, pp. 83–91 (1996).

Y. Wada et al., "Photochemical Mutual Separation Technology between Plutonium and Neptunium in Nitric Acid Solution", *Radiochimica Acta* 68, pp. 233–243 (1995).

Y. Wada et al., "Separation and Coextraction of Pu and Np by solvent Extraction Using 30% TBP/n–dodecane after and during Photochemical Valence Adjusting", *Radiochimica Acta*, 72, pp.195–204 (1996).

Derwent Abstract No. 93–397799/50 relating to JP 5297185 (Mitsubishi) 12 Nov. 1993.

Derwent Abstract No. 93–129441/16 relating to JP 5066290 (Japan Atomic Energy Research) 19 Mar. 1993.

Kazanjian, Amen R; Photochemical Reactions in Plutomium–Nitric Acid Solutions, Dec. 1981, RFP–3113, 5 pgs.

*Primary Examiner*—Ngoclan Mai
*Attorney, Agent, or Firm*—Oliff & Berridge

[57] ABSTRACT

The powdered form of nuclear fuels such as uranium dioxide and plutonium dioxide are dispersed in an about 3N aqueous nitric acid solution, and irradiated by UV rays at a wavelength of approximately 300 nm in order to improve a dissolving rate of the nuclear fuels. This enables easy and efficient dissolution of the nuclear fuels.

17 Claims, 11 Drawing Sheets

EMISSION SPECTRUM OF A MERCURY LAMP

PHOTO-DISSOLVING RATE OF URANIUM

COMPARISON AMONG PHOTO-DISSOLVING RATES OF URANIUM

ABSORPTION SPECTRA OF NITRIC ACID
[HNO$_3$] = 0.1N, 0.5N, 1N, 3N

CHANGES IN STANDARD ELECTRODE POTENTIAL BY LIGHT IRRADIATION

METHOD FOR DISSOLVING NUCLEAR FUELS

BACKGROUND OF THE INVENTION

1. Field of the Invention

The present invention relates to a method for dissolving nuclear fuels using aqueous nitric acid solution irradiated by ultraviolet rays.

2. Description of the Related Art

Nuclear fuels used in nuclear power plants are reused in Japan. In the reprocessing of nuclear fuels, the used nuclear fuels have been required to be dissolved using nitric acid heated at more than 100° C. Nitric acid is incapable of dissolving uranium oxide and plutonium oxide at room temperature, therefore it is necessary to increase its oxidation activity by heating it in order to dissolve them.

When the used nuclear fuel is dissolved using heated nitric acid, the erosion of a dissolving bath as well as the generation of a large amount of nitrogen oxides ($NO_x$ gases), which are decomposition products of nitric acid, occurs. The dissolving bath is equipped with a heating apparatus, and is required to have a thermally resistant structure for safety.

These prevent simplification of the plant structure. A denitration process is necessary to remove a large amount of generated $NO_x$ gas, also preventing the simplification.

SUMMARY OF THE INVENTION

The purpose of the present invention is to provide a method for dissolving used nuclear fuels without heating a dissolving bath or generating a large amount of $NO_x$ gas.

In accordance with the first aspect of the present invention to accomplish the purpose, a method for dissolving nuclear fuels includes irradiation of ultraviolet (UV) rays when the nuclear fuels are dissolved in a nitric acid solution.

In accordance with the second aspect of the present invention, the method of the first aspect wherein the nuclear fuels include uranium oxide, plutonium oxide and mixtures thereof.

In accordance with the third aspect of the present invention, the method of the first aspect wherein the wavelength of the UV rays applied is less than 400 nm.

In accordance with the fourth aspect of the present invention, the method of the second aspect wherein the wavelength of the UV rays applied is in the range of 150 to 350 nm.

In accordance with the fifth aspect of the present invention, the method of the first aspect wherein a mercury lamp or laser is used as a UV ray source.

In the methodology provided by the present invention, the concentration of nitric acid in the aqueous solution used for dissolving nuclear fuels can be adjusted in the range of 1 to 10N. When a 3N nitric acid solution, usually used in the solvent extraction process after the dissolving process, is selected, the efficiency of the whole process is improved.

When an aqueous nitric acid solution is irradiated by UV rays, nitric acid molecules are excited to have enhanced oxidation activity. Nuclear fuel is oxidized by the excited nitric acid molecules and dissolved in the solvent. According to the method for dissolving solid nuclear fuels provided by the present invention, nitride nuclear fuels can be dissolved as well as oxide nuclear fuels such as uranium oxide and plutonium oxide.

The wavelength of the UV rays applied is preferably less than 400 nm, further preferably in the range of 150 to 350 nm. A mercury lamp, used as a UV ray source, can most efficiently radiate UV rays with the above wavelengths.

The method provided by the present invention can be applied to the process in which nuclear fuels need to be dissolved at least once, such as the reprocessing of used nuclear fuels. When the method is applied to the reprocessing of nuclear fuels, a used nuclear fuel is dispersed in an aqueous nitric acid solution. The dispersion is then irradiated using a mercury lamp in order to dissolve the dispersed nuclear fuel at room temperature. According to the method for dissolving nuclear fuels provided by the present invention, nuclear fuels are dissolved at room temperature without the heating of the solvent, consequently the production of toxic nitrogen oxides can be prevented.

DESCRIPTION OF THE PREFERRED EMBODIMENTS

[Experiment]

Figure 1:
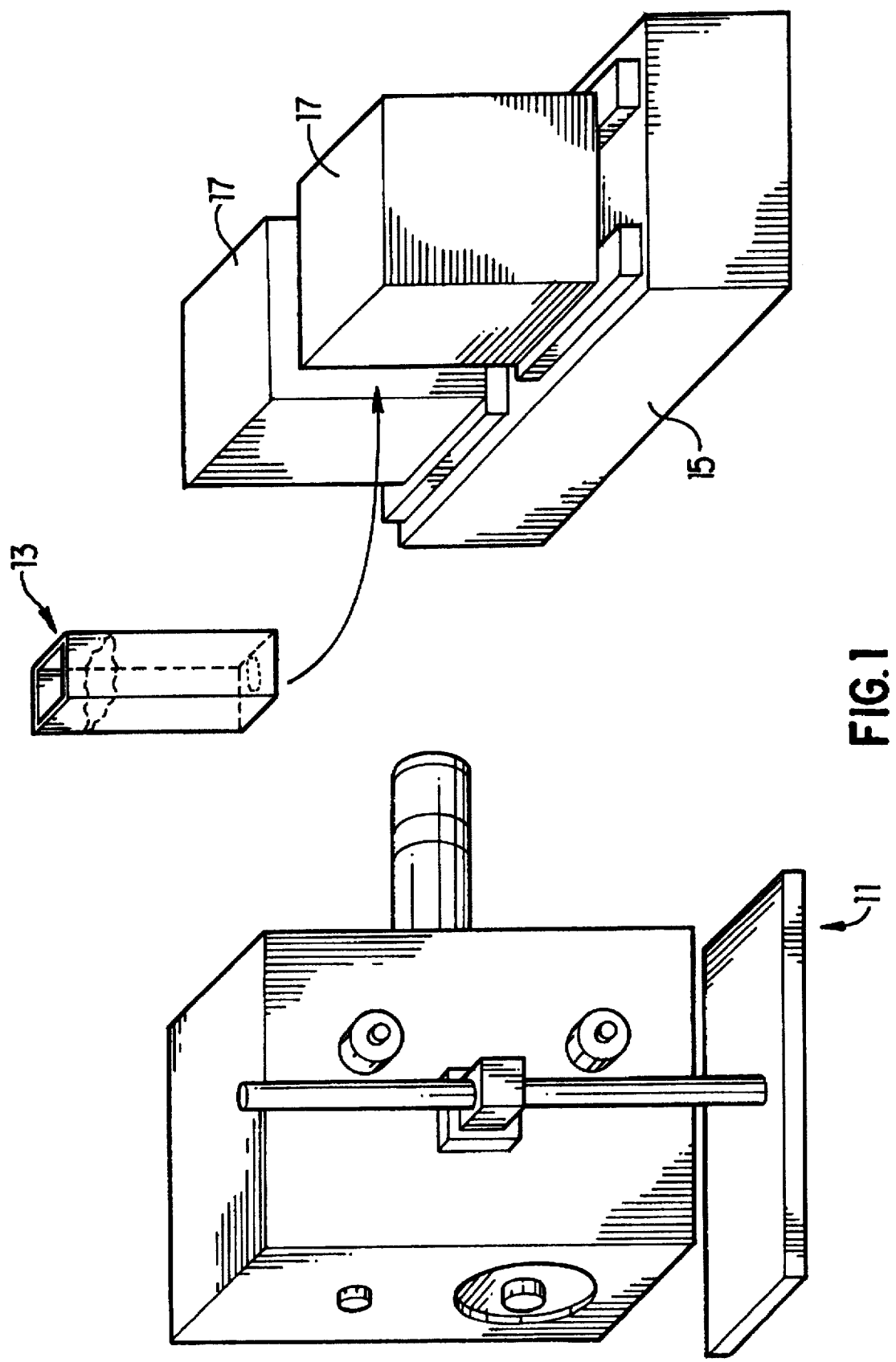
FIG. 1 shows a schematic diagram of an apparatus for measuring the photo-dissolving reaction.
Figure 2:
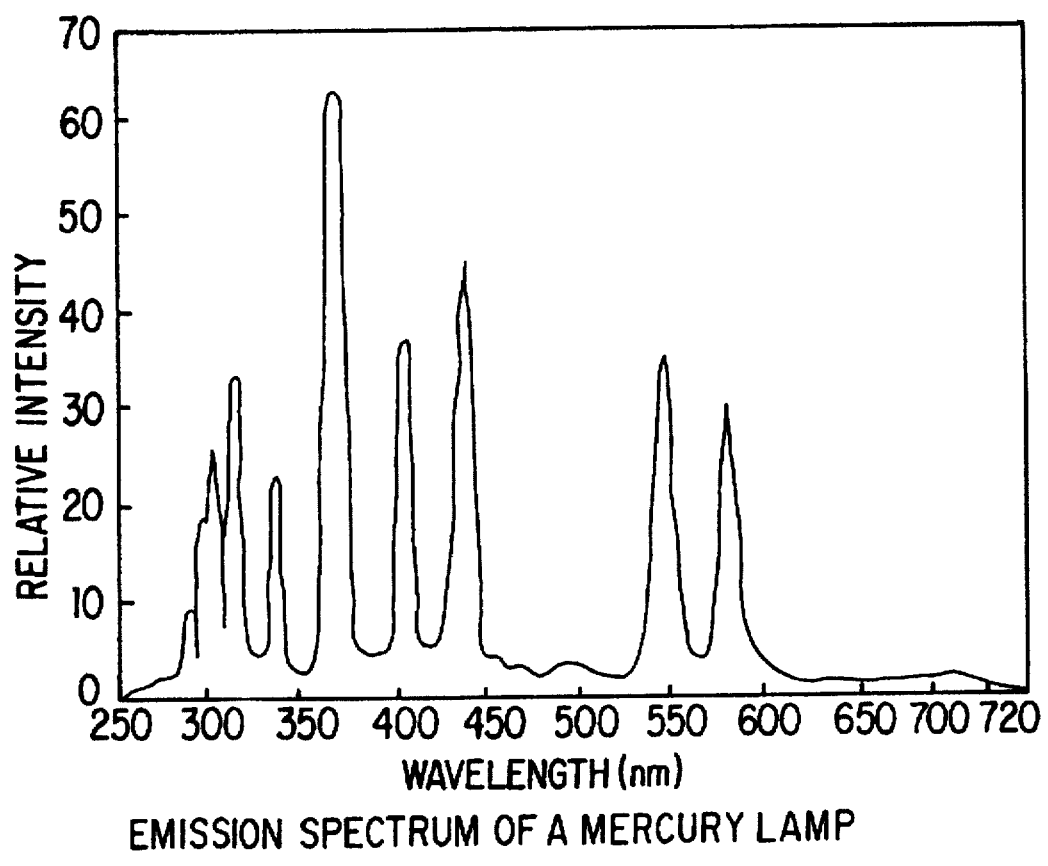
FIG. 2 shows an emission spectrum of a mercury lamp.

The experiments were carried out using an apparatus shown in FIG. 1. A mercury lamp 11 with an emission spectrum shown in FIG. 2 was used as a UV ray source for irradiation. A pulverized material to be dissolved was dispersed in a 3N nitric acid solution. The dispersion (2 ml) was put in a sample cell 13, and irradiated by UV rays. During UV irradiation, the dispersion sample in the sample cell 13 was stirred using a magnetic stirrer 15, and maintained at a constant temperature by temperature controllers 17 adjacent to the sample cell 13. The dispersion sample was irradiated by UV rays from the mercury lamp 11 at an irradiation rate of approximately 1.5 W/cm². The dissolved amount of the dispersed material was analyzed at predetermined intervals by absorption spectroscopy.

[Results]

(Photo-dissolving of uranium dioxide)

Figure 3:
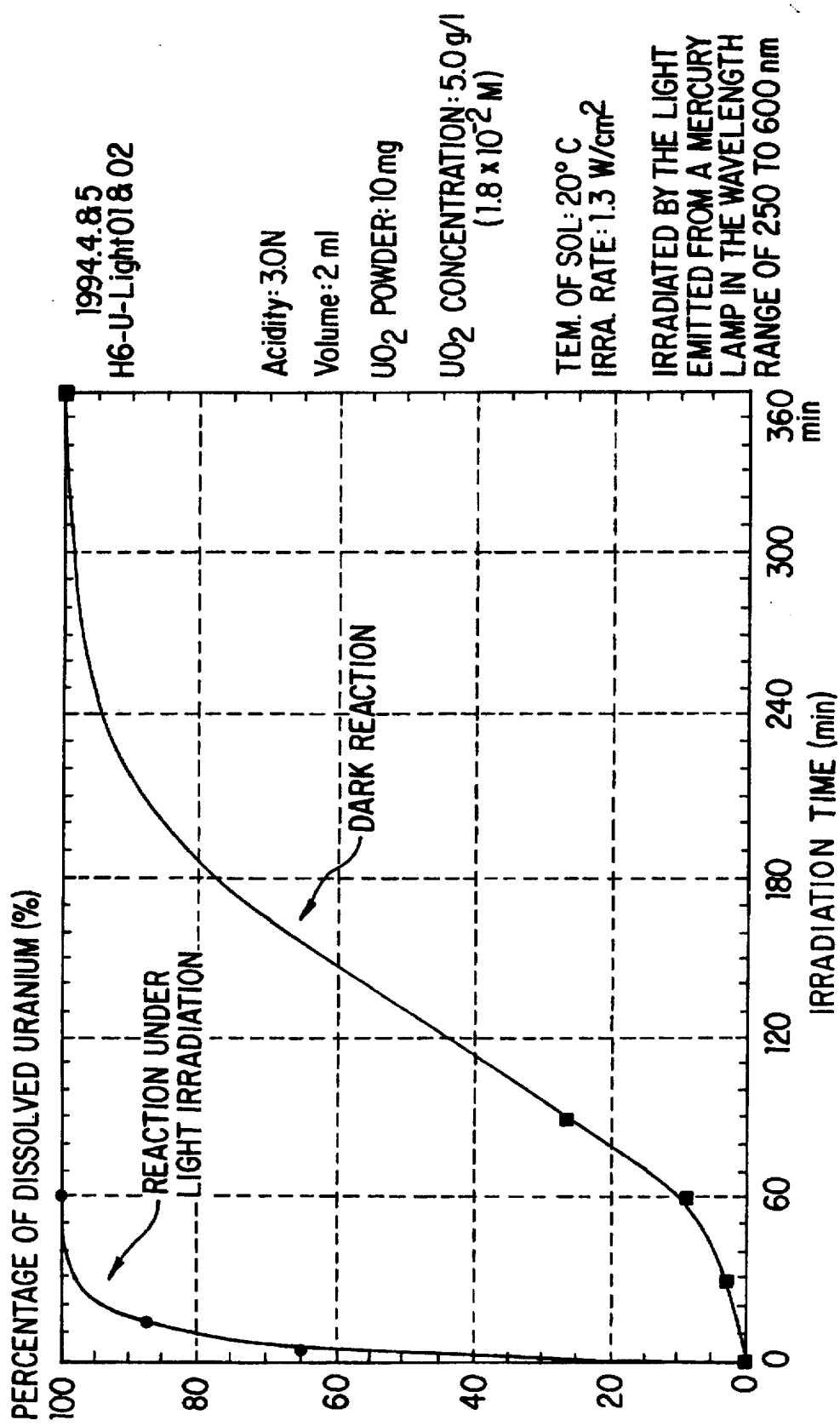
FIG. 3 shows a photo-dissolving rate of uranium dioxide.

A result from the photo-dissolving test for uranium dioxide ($UO_2$) is shown in FIG. 3. The dissolving rate was defined as the percentage of a dissolved amount of $UO_2$ to an initially dispersed amount of $UO_2$. $UO_2$ powder (10 mg) was dispersed in 2 ml of 3N nitric acid solution (final concentration of $UO_2$:5.0 g/l (1.8 ×10$^{31}$ $^2$M)). The temperature of the dispersion sample was maintained at 20° C. The dispersion sample was irradiated by the light emitted from the mercury lamp in the wavelength range of 250 to 600 nm at an irradiation rate of 1.3 W/cm$^2$. As shown in FIG. 3, the $UO_2$ powder was almost completely dissolved after 60 min with light irradiation, whereas it took 360 min to dissolve all of the dispersed $UO_2$ powder without light irradiation. From this result, the light irradiation using the mercury lamp can improve the dissolving rate for $UO_2$.

Figure 4:
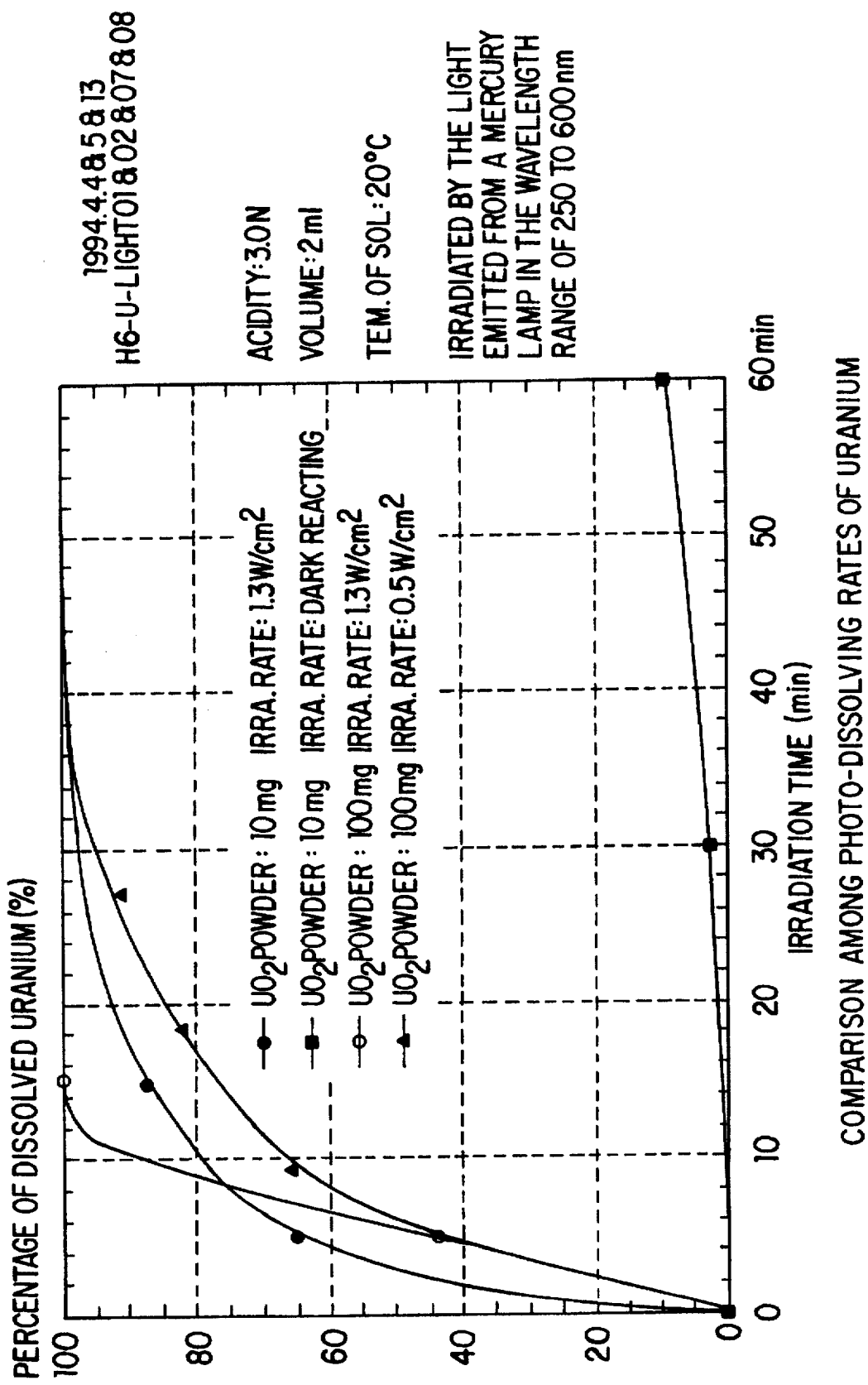
FIG. 4 shows a comparison among photo-dissolving rates for uranium dioxide.

Another result from the photo-dissolving test for $UO_2$ is shown in FIG. 4. In this measurement, the amount of dispersed $UO_2$ powder was varied, and the amount and acidity of the measured sample, the reaction temperature and the wavelengths of the light applied to the sample were the same as in FIG. 3. The result shown in FIG. 4 reveals that the photo-dissolving rate is improved when the amount of dispersed $UO_2$ powder is increased from 10 to 100 mg, and the decrease in irradiation rate of the light emitted from the mercury lamp leads to a decrease in the dissolving rate.

Figure 5:
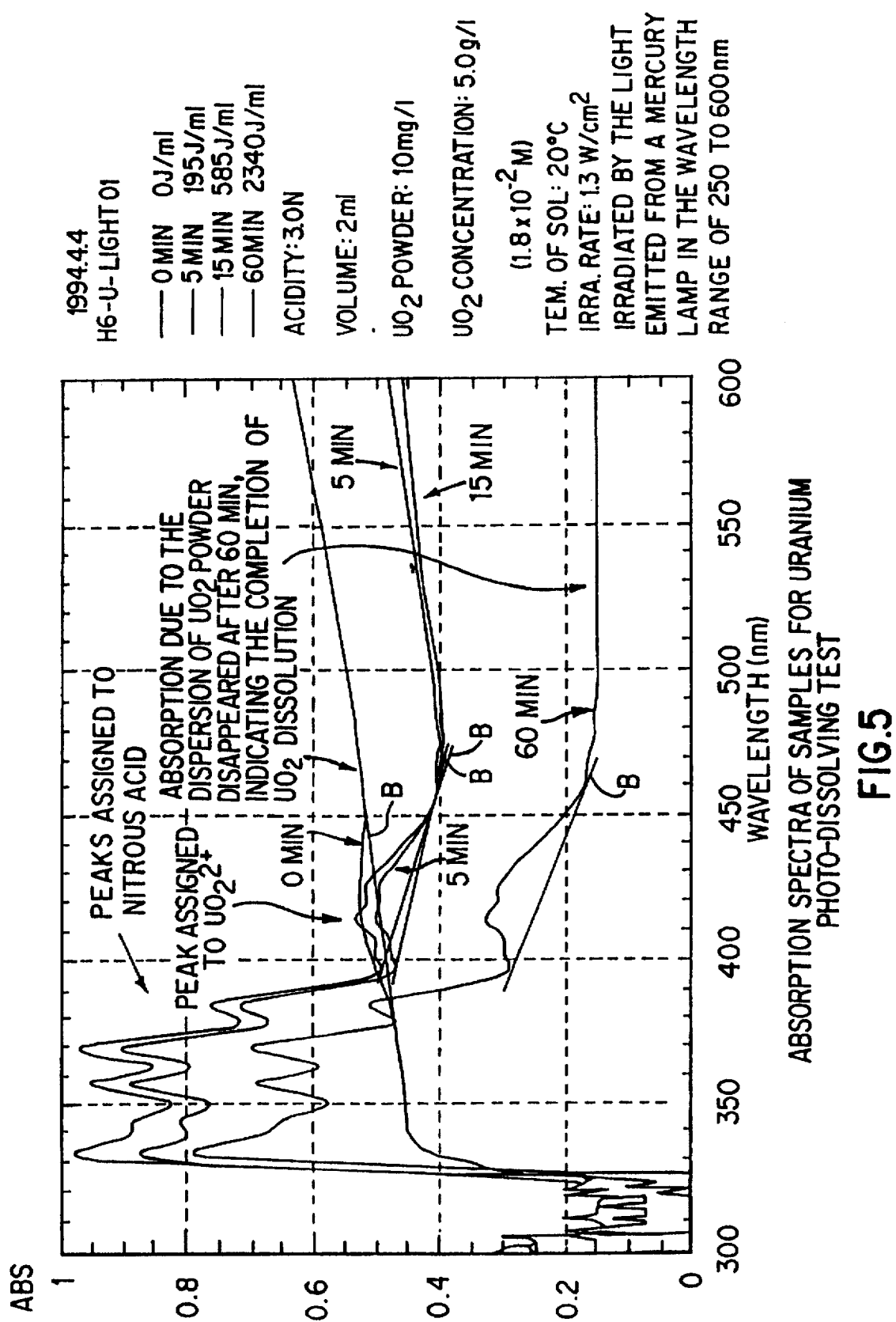
FIG. 5 shows the absorption spectra of photo-dissolving test samples of uranium dioxide.

Time-course changes in an absorption spectrum of $UO_2$ powder dispersion during light irradiation are shown in FIG. 5. (It should be noted that the base lines of absorbance are apparently elevated because the applied light is screened by the dispersed $UO_2$ powder at the initial stage of the dissolving reaction.) As shown in FIG. 5, the height from each base line B to the peak assigned to the uranium dioxide ion increased with reaction time.

In contrast, the absorption due to the dispersion of uranium dioxide powder (the absorption arising from the screening by the dispersed uranium dioxide powder) completely disappeared after 60 min. This absorption data indicates that the dispersed uranium dioxide is completely dissolved after 60 min. The peak assigned to nitrous acid increased with the progress of the dissolution of uranium. (The position of the base line should be noted.) The result shown in FIG. 5 indicates that the concentration of nitrous acid, a by-product in the dissolving reaction, increases simultaneously with the uranium dioxide dissolution by light irradiation. As described later, the nitrous acid is thought to be helpful in dissolving uranium dioxide. (Photo-dissolving of plutonium dioxide)

Figure 6:
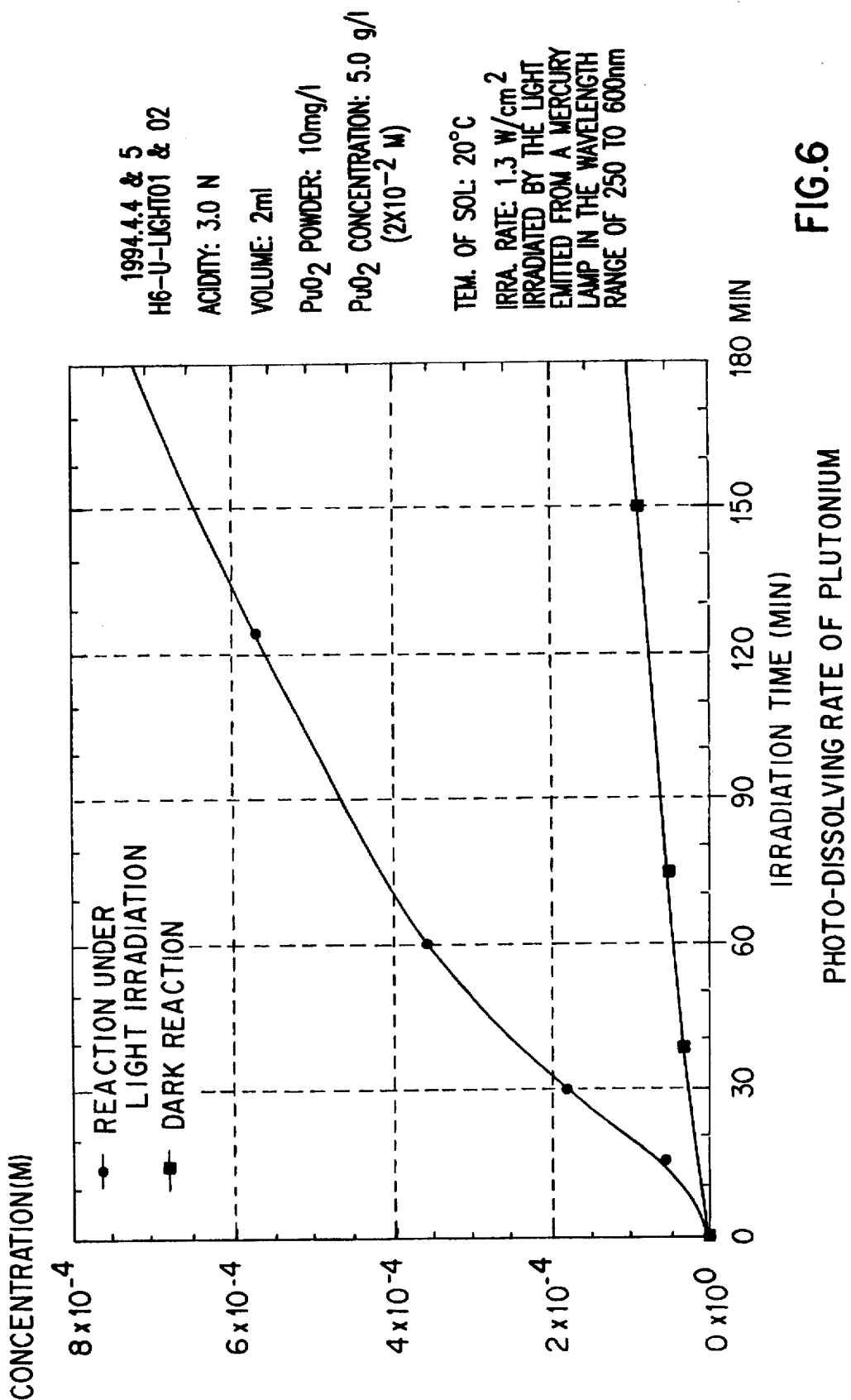
FIG. 6 shows a photo-dissolving rate of plutonium dioxide.

A result from the photo-dissolving test for plutonium dioxide ($PuO_2$) is shown in FIG. 6. The conditions of the dissolving reaction were the same as those for $UO_2$ shown in FIG. 3. The vertical axis shows a concentration of dissolved tetravalent Pu which was measured by absorbance. From this result, the light irradiation using the mercury lamp can also improve the dissolving rate for $PuO_2$.

Figure 7:
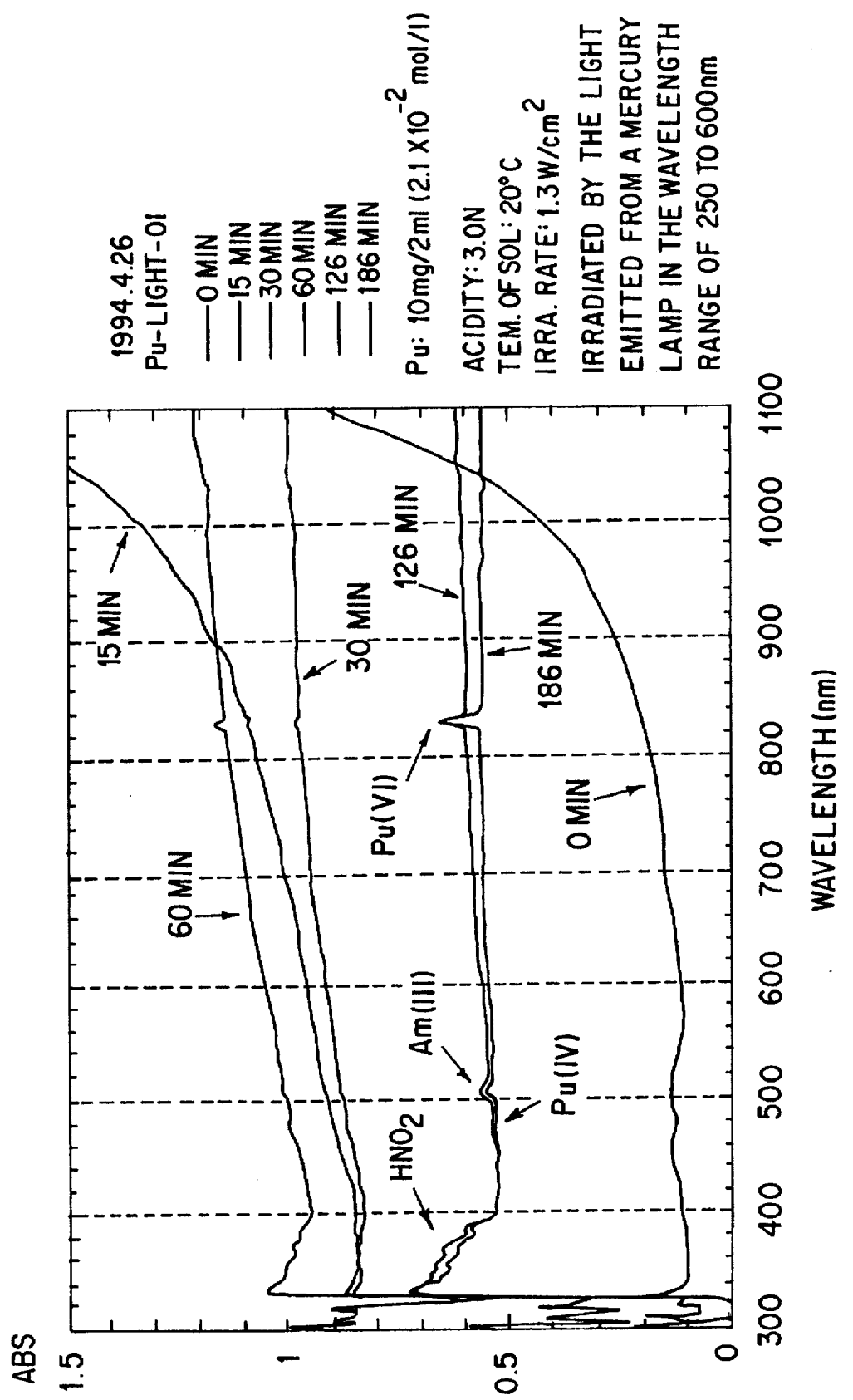
FIG. 7 Shows the absorption spectra of photo-dissolving test samples of plutonium dioxide.

Time-course changes in an absorption spectrum of $PuO_2$ powder dispersion during light irradiation are shown in FIG. 7. The light irradiation brought about an increase in the absorption due to tetravalent plutonium at an initial stage, subsequently an increase in the absorption due to hexavalent plutonium occurred by continuing the light irradiation. The concentration of nitrous acid simultaneously increased.

Photo-excited nitric acid molecules are thought to oxidize tetravalent plutonium ions to hexavalent as well as plutonium dioxide. Considering the fact that nitrous acid is a good agent for dissolving uranium dioxide or plutonium dioxide, the nitrous acid generated by the light irradiation is thought to promote nuclear fuel dissolution. Although nitrous acid might be consumed to dissolve nuclear fuel, the concentration of nitrous acid increased during the dissolving reaction. A relatively large amount of nitrous acid, a by-product of the dissolving reaction, is produced compared with its consumption, and is thought to be the reason for the accumulation of the nitrous acid, leading to an increase in nitrous acid concentration.

[Discussion]

Figure 8:
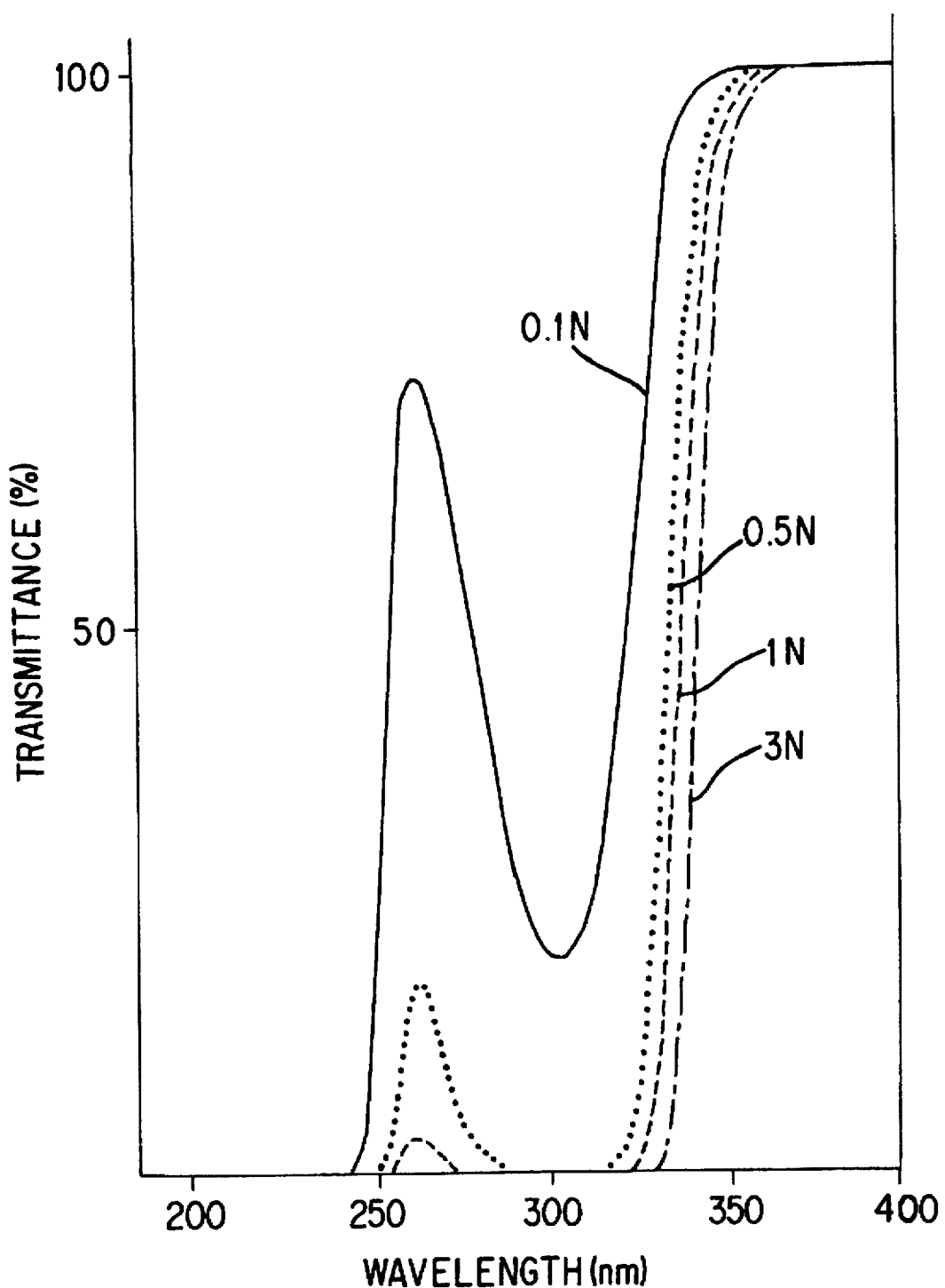
FIG. 8 shows the absorption spectra of nitric acid.

The absorption spectra of nitric acid are shown in FIG. 8. In FIG. 8, nitric acid has an absorption peak at about 300 nm, because the spectra show a minimum transmittance at about 300 nm. This suggests that nitric acid strongly absorbs UV rays at about 300 nm, and nitric acid molecules are excited to short-lived photo-excited ions by the absorbed UV rays. The photo-excited ions are thought to have an enhanced oxidation activity, because their internal energy is temporarily increased by photo-excitation.

Figure 9:
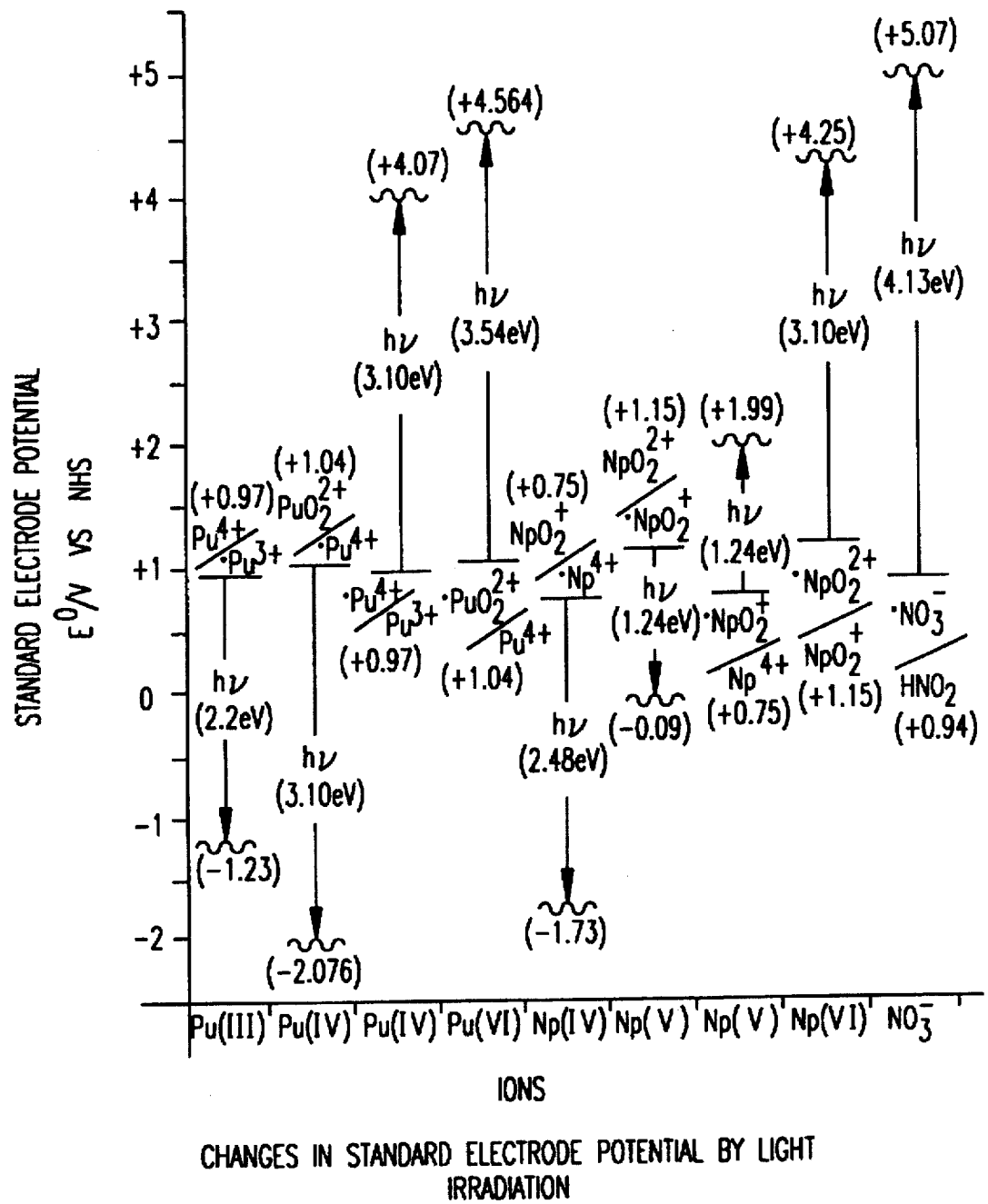
FIG. 9 shows standard electrode potentials of various ions.

Standard electrode potentials of the ions involved in the present invention are shown in FIG. 9. The energy of the light at 300 nm is 4.13 eV, suggesting that the standard electrode potential of normal nitric acid increases from 0.94 to 5.07 V. An oxidation activity of 4.13 eV can theoretically oxidize many other ions. Because most of the standard electrode potentials of the ions shown in FIG. 9 are less than 4.13 eV, the photo-excited nitric acid ion can easily oxidize the ions and molecules shown in FIG. 9.

Here, the reaction rate will be discussed. Firstly, the dissolving rate under the photo-excited condition can be expressed by the following equations:

$$\begin{cases} UO_2^{2+} + 2e = UO_2(s) & (E = +0.447) \\ {}^*NO_3^- + 3H^+ + 2e = HNO_2 + H_2O & (E = +0.941\uparrow) \end{cases} \quad (1)$$

$$UO_2(s) + {}^*NO_3^- + 3H^+ = UO_2^{2+} + HNO_2 + H_2O$$

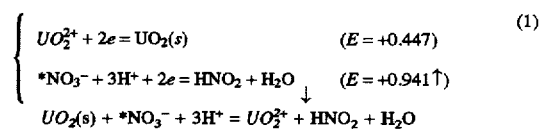

$$\frac{dc}{dt} = \frac{{}^*k_1[{}^*NO_3^-]^c[H^+]^b \cdot N \cdot S}{V} \quad (2)$$

*$k_1$:PHOTO-DISSOLVING RATE COEFFICIENT
[*$NO_3$]:PHOTO-EXCITED NITRIC AND ION
$N$:NUMBER OF $UO_2$ PARTICLES
$S$:SURFACE AREA OF $UO_2$ PARTICLES
$V$:VOLUME OF SOLUTION

Secondly, the dissolving rate for the nitrous acid generated by UV ray irradiation can be obtained according to the following equations:

$$\begin{cases} UO_2^{2+} + 2e = UO_2(s) & (E = +0.447) \\ 2HNO_2 + 4H^+ + 4e = N_2O + 3H_2O & (E = +1.29) \end{cases} \quad (3)$$

$$UO_2 + 2HNO_2 + 4H^+ = 2UO_2^{2+} + N_2O + 3H_2O$$

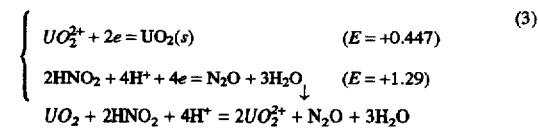

$$\frac{dc}{dt} = \frac{k_2[HNO_2]^c[H^+]^d \cdot N \cdot S}{V} \quad (4)$$

* $k_2$:DISSOLVING RATE COEFFICIENT BY NITROUS ACID

The actual dissolving rate is thought to be a sum of (2) and (4), consequently expressed by the following equation:

$$\frac{dc}{dt} = \frac{{}^*k_1[{}^*NO_3^-]^c[H^+]^b \cdot N \cdot S}{V} + \frac{k_2[HNO_2]^c[H^+]^d \cdot N \cdot S}{V} \quad (5)$$

When uranium dioxide or plutonium dioxide is dissolved by means of light irradiation, the generation of toxic nitrogen oxides such as nitrogen monoxide or nitrogen dioxide, is not observed. Although nitrous oxide is generated as shown in Equation (3), it is much less toxic than nitrogen monoxide or nitrogen dioxide, causing fewer problems.

Here, comparison between the photo-dissolving and thermal dissolving will be carried out. In the thermal dissolving, nitrogen monoxide and nitrogen dioxide are generated in a nitric acid solution by heating, according to the equation below.

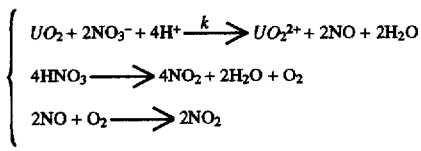

The nitrous acid generated in the thermal dissolving is instable and decomposed at more than 50° C. The amount of nitrous acid present in the solution is, therefore, very small, resulting in low dissolving efficiency and large generation of nitrogen oxides. In the photo-dissolving, toxic nitrogen oxides are not observed to arise. Although the reason is not very clear, little generation of the toxic nitrogen oxides is thought to be due to the fact that nitrous acid generated efficiently by light irradiation as well as the photo-excited nitric acid participates in dissolving nuclear fuels.

[Photochemical dissolution apparatus]

Figure 10:
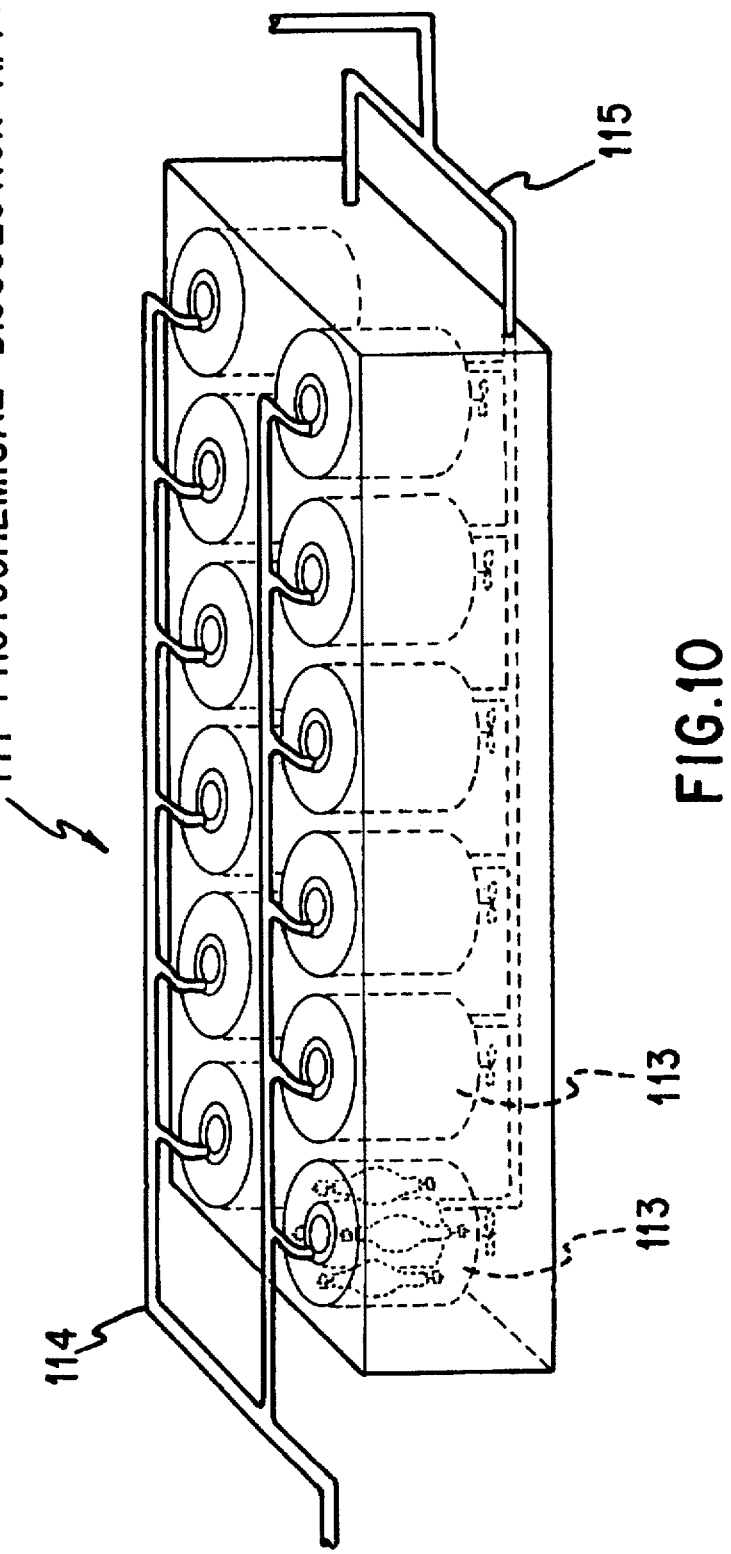
FIG. 10 shows a schematic diagram of a photochemical dissolution apparatus used in an embodiment of the present invention.

A schematic diagram of a photochemical dissolution apparatus used in a preferred embodiment of the present invention is shown in FIG. 10. This apparatus preferably enables the method for dissolving nuclear fuels provided by the present invention.

The photochemical dissolution apparatus 111 in this embodiment has 12 photo-oxidization units 113 which are arranged in two rows. Liquid materials are charged to each photo-oxidization unit 113 of the photochemical dissolution apparatus 111 through feed pipes 114. Liquid products produced in the photo-oxidization unit 113 are discharged through drain pipes 115. The reaction conditions of the solution such as concentration, temperature and flow rate are adjusted according to those described before.

Figure 11:
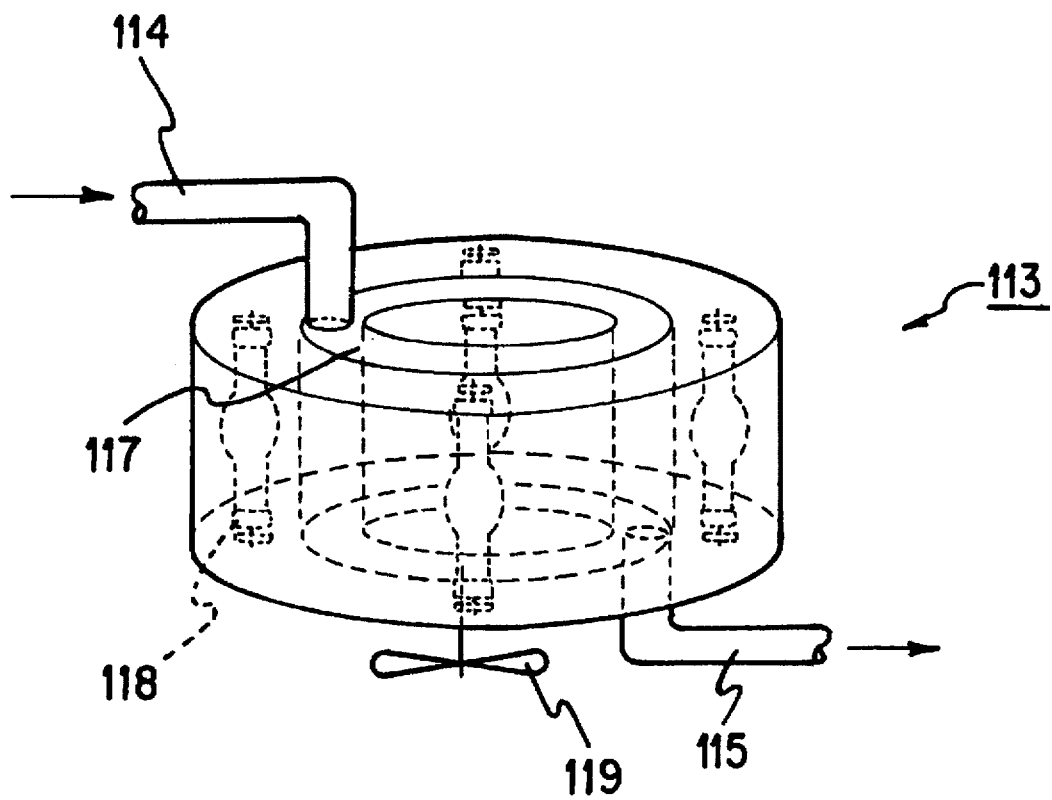
FIG. 11 shows a schematic diagram of a photo-oxidization unit in a photochemical dissolution apparatus used in an embodiment of the present invention.
Figure 12:
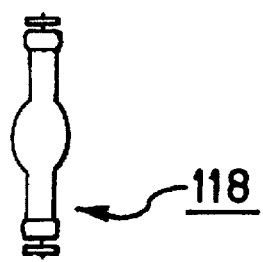
FIG. 12 shows a schematic diagram of a mercury lamp used in an embodiment of the present invention.

A schematic diagram of the photo-oxidization unit 113 used in the photochemical dissolution apparatus 111 is shown in FIG. 11. As shown in FIG. 11, the photo-oxidization unit 113 has a reaction cell 117 which is made of glass for light application. The reaction cell 117 has a cylindrical shape, and is equipped with mercury lamps 118 inside and around itself. In this embodiment, four mercury lamps 118 are disposed around the reaction cell 117, one mercury lamp 118 at the center of the reaction cell 117 (FIG. 11). A cooling fan 119 is disposed to cool the whole unit.

In this embodiment, the inner diameter of the reaction cell 117 is approximately 30 cm, its thickness 3 cm and its height approximately 10 cm. The mercury lamps 118 used have a power of 350 W and the characteristics described before.

The photochemical dissolution apparatus 111 in this embodiment can be used in the reprocessing of used nuclear fuels in a nuclear fuel cycle.

As described above, the method for dissolving nuclear fuels according to the present invention enables the elimination of the heating means and the simplification of the plant structure. The absence of heating (the dissolving reaction can progress at room temperature.) leads to a prolonged life of a reaction bath and cost reduction of the structural materials and apparatuses used in the dissolving process.

In accordance with the method for dissolving nuclear fuels provided by the present invention, the dissolving reaction rate is adjusted by varying the intensity of applied light, therefore, the dissolving reaction can be easily controlled. When the concentration of a nuclear fuel to be dissolved is increased, the reaction rate is not decreased. This realizes an efficient dissolving reaction.

While there has been described what are at present considered to be preferred embodiments of the invention, it will be understood that various modifications maybe made thereto, and it is intended that the appended claims cover all such modifications as fall within the true spirit and scope of the invention.

We claim:

1. A method for dissolving nuclear fuels comprising the steps of:

charging solid nuclear fuels into an aqueous nitric acid solution; and applying ultraviolet rays to the aqueous nitric acid solution and the solid nuclear fuels charged therein.

2. A method for dissolving nuclear fuels in accordance with claim 1 wherein the nuclear fuels include uranium oxide, plutonium oxide and mixtures thereof.

3. A method for dissolving nuclear fuels in accordance with claim 1 wherein the wavelength of the UV rays applied is less than 400 nm.

4. A method for dissolving nuclear fuels in accordance with claim 2 wherein the wavelength of the UV rays applied is less than 400 nm.

5. A method for dissolving nuclear fuels in accordance with claim 3 wherein the wavelength of the UV rays applied is in the range of 150 to 350 nm.

6. A method for dissolving nuclear fuels in accordance with claim 4 wherein the wavelength of the UV rays applied is in the range of 150 to 350 nm.

7. A method for dissolving nuclear fuels in accordance with claim 1 wherein a mercury lamp or laser is used as a UV ray source.

8. A method for dissolving nuclear fuels in accordance with claim 2 wherein a mercury lamp or laser is used as a UV ray source.

9. A method for dissolving nuclear fuels comprising the steps of:

charging solid nuclear fuels into an aqueous nitric acid solution, said aqueous nitric acid solution consisting essentially of nitric acid and water; and applying ultraviolet rays to the aqueous nitric acid solution and the solid nuclear fuels charged therein.

10. A method for dissolving nuclear fuels in accordance with claim 9, wherein the nuclear fuels include uranium oxide, plutonium oxide and mixtures thereof.

11. A method for dissolving nuclear fuels in accordance with claim 9, wherein a wavelength of the ultraviolet rays is less than 400 nm.

12. A method for dissolving nuclear fuels in accordance with claim 10, wherein a wavelength of the ultraviolet rays is less than 400 nm.

13. A method for dissolving nuclear fuels in accordance with claim 11, wherein the wavelength of the ultraviolet rays is 150 to 350 nm.

14. A method for dissolving nuclear fuels in accordance with claim 12, wherein the wavelength of the ultraviolet rays is 150 to 350 nm.

15. A method for dissolving nuclear fuels in accordance with claim 9, wherein a mercury lamp or laser is used as a source of said ultraviolet rays.

16. A method for dissolving nuclear fuels in accordance with claim 10, wherein a mercury lamp or laser is used as a source of said ultraviolet rays.

17. A method for dissolving nuclear fuels, comprising the steps of:

charging solid nuclear fuels into an aqueous nitric acid solution, fluoride ions being excluded from said aqueous nitric acid solution; and applying ultraviolet rays to the aqueous nitric acid solution and the solid nuclear fuels charged therein.

* * * * *